United States Patent [19]
Kesti

[11] 3,863,545
[45] Feb. 4, 1975

[54] POSITIONING DEVICE
[75] Inventor: Richard R. Kesti, Akron, Ohio
[73] Assignee: International Basic Economy Corporation, New York, N.Y.
[22] Filed: Mar. 14, 1973
[21] Appl. No.: 341,264

Related U.S. Application Data
[62] Division of Ser. No. 196,979, Nov. 9, 1971, Pat. No. 3,735,781.

[52] U.S. Cl. ............................. 91/45, 92/18, 92/24
[51] Int. Cl. ........................ F15b 15/26, F16k 35/04
[58] Field of Search ............. 251/297; 277/169, 71; 91/44, 45; 92/24, 26, 30, 18, 19; 137/625.68, 625.64, 624.27

[56] References Cited
UNITED STATES PATENTS
2,675,024  4/1954  Clark ........................... 137/625.68
3,735,781  5/1973  Kesti ............................ 251/297 X Primary Examiner—Martin P. Schwadron
Assistant Examiner—Robert J. Miller
Attorney, Agent, or Firm—Alan N. McCartney

[57] ABSTRACT

A valve unit or rectilinear positioning device having a plurality of operating positions and arranged such as to hold the operating position last encountered upon inactivation of the valve or positioning device moving and control means comprising a body including a bore, a slide positioner or slide valve reciprocable in the bore between the two operating positions, at least two elastic ring seals spaced along the bore, and partially recessed into the periphery thereof, said seals having an unexpanded ring diameter substantially equal to or slightly less than the ring diameter of complemental detents or recesses on the slide positioner into which the seals are selectively seated, means for applying fluid pressure to the ring seals and to the ends of the slide positioner or slide valve, and means for locking and unlocking the elastic ring seals to the slide positioner simultaneously with moving it to the next operating position and holding it in that position upon inactivation of the moving means.

4 Claims, 6 Drawing Figures

POSITIONING DEVICE

This is a division of application Ser. No. 196,979 filed on Nov. 9, 1971 now U.S. Pat. No. 3,735,781.

BACKGROUND OF THE INVENTION

Rectilinear positioning devices such as valve units are used in a wide array of machinery wherein a pressurized fluid positions the valve or positioning device to divert fluid flow from one conduit to another and/or to change the position of some other element. These machines include molding machines, presses, lathes, boring machines, planers, etc.

Generally speaking, these positioning devices or valves comprise a body including a bore wherein a slide positioner or slide valve is reciprocable in the bore between two or more operating positions. Pressurized fluid is used to force the slide valve or positioning device from one position to another by exerting pressure at one end of the slide and releasing pressure at the other end. These devices function operably under many circumstances and have gained wide acceptance in the control field. However, there are instances where they undergo uncontrollable changes in position which create errors in the control circuitry and programming of the equipment and, in some cases, result in damage to the equipment or to the products. Two of these circumstances wherein this difficulty has arisen are (1) where the device is subject to severe jolting or jarring such that the slide is moved out of its intended position and (2) wherein the slide changes position during inactivation of the controlling means for positioning the slide, i.e., the fluid drive means; this inactivation may come from a power failure or maintenance shutdown.

To some extent, the prior art has overcome the first of these instances by providing ring seals in detents on the slide that are forced under fluid pressure into tight contact with the smooth periphery of the bore so as to hold the slide in the desired position under this fluid pressure within the bore, reference U.S. Pat. No. 2,675,024. This prior art, however, has not solved the second of these circumstances, i.e., that wherein the control means for altering the pressurized fluid flow that is used to drive the slide and/or the fluid pressurization is inactivated allowing the expanded ring seals to either slowly deflate under loss of pressure so that the slide will move if jarred, or allowing the slide to move uncontrollably under action of gravity.

It is to these two circumstances that the present invention is directed. Generally speaking, this invention provides a means for holding the slide in the desired position after it is forced into position by virtue of fluid pressure and throughout severe jarring and jolting and secondly, a means for holding the slide in the last encountered position during the time when the drive control means and/or the positioning means are inactivated.

Accordingly, the main object of this invention is a rectilinear positioning device or slide valve unit that will remain immobilized in an operable position when the device is subject to severe jarring or jolting in combination with means for providing the device with immobilized positioning that will remain when the fluid control means is inactivated or the fluid pressurization lost. Other objects of the invention include a novel means for positioning a slide within a bore such that the slide is restrained from unwanted motion upon total inactivation of the fluid drive means and during unwanted jarring or jolting. These and other objects of this invention will become more apparent upon reading the description of the preferred embodiment in conjunction with the drawings attached hereto.

SUMMARY OF THE INVENTION

This invention concerns a valve unit comprising a body including a bore and a plurality of pressure fluid flowing ports communicating with the bore, a slide valve reciprocal in the bore between a plurality of operating positions selectively to interconnect the ports, at least two elastic ring seals spaced along the bore, and partially recessed into the periphery thereof, said seals having an unexpanded ring diameter substantially equal to or slightly less than the ring diameter of complemental detents or recesses on the slide positioner into which the seals are selectively seated, a first means for applying fluid pressure to the ring seals to contract and expand them in their respective recesses and for applying fluid pressure to the ends of the slide valve, and a second means for causing the first means to selectively expand at least one of the ring seals into its recess in the bore and contract at least one of the ring seals into engagement with the slide valve while simultaneously urging the slide valve to the other operating position where the contracted ring seal seats in a complemental detent on the slide valve to immobilize the slide valve such that, upon inactivation of either the first or second means, the slide valve is restrained from movement.

DESCRIPTION OF THE PREFERRED EMBODIMENT

Figure 1:
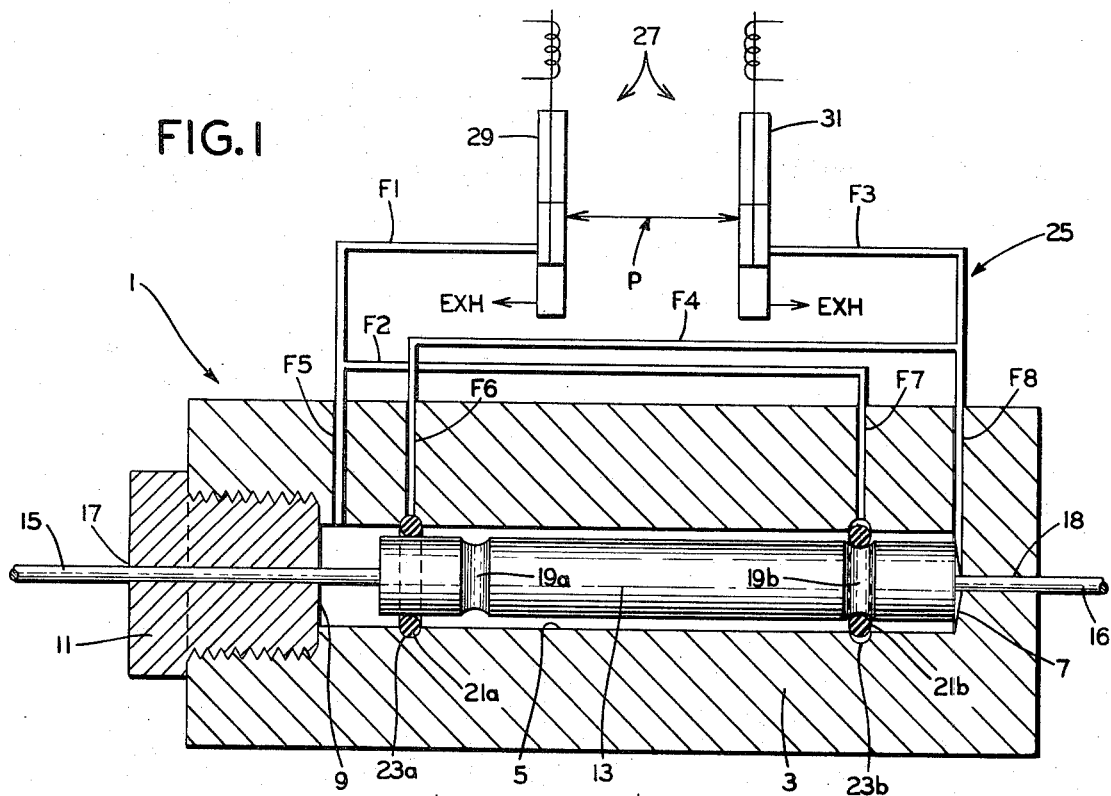
FIG. 1 is a partly diagrammatic view, in longitudinal section, of a rectilinear positioning device in accordance with one embodiment of this invention showing the slide positioner in one operable position.

This invention finds use inter alia as a rectilinear positioning device and as a slide valve. Both of these embodiments are shown in the drawings attached hereto. Referring now to the drawings wherein like elements are identified with like numerals throughout the six figures, FIG. 1 shows a typical rectilinear positioning device 1 of this invention which comprises a body 3 that is a mass of solid material sufficient to withstand the pressure required having located therein a bore 5, which is a cylindrical opening within the body 3. As shown, bore 5 is a ported ended cylindrical bore having ends 7 and 9 wherein bore end 9 is formed by a ported bushing 11 that is threaded into the end of body 3.

Inside bore 5 is a slide positioner 13 that comprises a piece of rigid material, sufficient to withstand the pressure required, of lesser diameter than the diameter of bore 5 and of somewhat less length so as to be able to reciprocate back and forth in bore 5 between two or more operating positions. Slide positioner 13 is attached either integrally or by known attachment means to positioning arms 15 and 16 that extend from bore 5 respectively through ports 17 and 18 in ported bushing 11 and port 18 for contact with whatever element or device (not shown) that requires positioning.

Spaced along slide positioner 13 are at least two detents 19a and 19b that comprise annular grooves about the periphery of slide positioner 13. Also spaced along bore 5 are at least two elastic ring seals 21a and 21b that are partially recessed into the periphery of bore 5 in respective recesses 23a and 23b that comprise annular grooves in the periphery of bore 5. Elastic ring seals 21a and 21b comprise circular rings of elastic material such as rubber that span the annular space between the periphery of bore 5 and the outer diameter of slide positioner 13 so as to hold positioner 13 substantially concentric with respect to bore 5. Elastic ring seals 21a and 21b are partially recessed in bore 5 and remain in the respective planes of recesses 23a and 23b throughout operation of rectilinear positioning device 1.

It is vital to the operation of rectilinear positioning device 1 that seals 21a and 21b have an unexpanded or free ring diameter substantially equal to or less than the respective ring diameters of the detents 19a and 19b into which the seals are selectively locked. By "unexpanded" is meant when the ring seals are not positioned on any element (i.e., the "as-purchased" condition); by "ring diameter" is meant the diameter of the circle described by the innermost surface of the ring in contrast to the diameter of a segment of the seal or of the circle described by a line positioned along the major axis of the seal. As to the detent, the ring diameter is the smallest diameter of the detent groove about the slide positioner in contrast to the diameter of a cross-section of the groove per se. By "substantially equal to or slightly less than" is meant that there is either a snug fit or a slight interference fit of the ring seal in the detent. A snug fit would be one wherein the ring diameter of the seal is such as to allow the seal to fit in the detent with only a few thousandths of an inch of clearance. A slight interference fit would be one wherein the ring diameter of the seal is such as to permit the seal to fit in the detent only by slighly expanding the seal (i.e., no clearance). An example of a ring diameter that is substantially equal to or slightly less than the ring diameter of the detent is a detent ring diameter of 1.362±0.002 inches and a seal ring diameter of 1.359±0.006 inches. At one end of the specification the fit is snug, i.e., 1.365 − 1.360=0.005 inches clearance whereas at the other end the fit is interference, i.e., 1.364 − 1.353=−0.011 inches interference.

The reason the ring seal should not be in an extreme interference fit with the detent is three-fold: (1) a highly stretched ring seal will deteriorate faster than one that is slightly stretched, (2) if stretched tight enough, the segment diameter of the seal may decrease to such an extent that the locking power of the seal (by spanning the detent and the bore recess) is lost, and (3) a tightly stretched ring seal is difficult to expand.

A first means 25 for applying fluid pressure to ring seals 21a and 21b and to the ends of slide positioner 13 is shown comprising fluid conduit means F1 through F8 which are fluid conduits, either tubing, piping, bored holes, or other apertured canals that conduct pressurized fluid P from a second means 27 to bore 5 and ring seals 21a and 21b.

A second means 27 for causing first means 25 to selectively expand at least one of ring seals 21 into its respective recess 23 and to contract at least one of ring seals 21 into engagement with slide positioner 13 comprises pilot valves 29 and 31 that are respectively energizable valves such as solenoid valves of the two-position type, e.g., either normally open or normally closed during inactivation, that receive a pressurized fluid P for distribution and for urging slide positioner 13 from one operating position to another by permitting the introduction of pressurized fluid into conduits F1 and F3 respectively, or alternatively, permitting the fluid pressure in conduits F1 and F3 to exhaust to the atmosphere.

In FIG. 1, slide positioning device 1 is shown in one operating position. Both pilot valves 29 and 31 are in the normally open position, i.e., when not energized they pass pressurized fluid P into fluid conduit means F1 to F8. Fluid pressure is also applied to ring seal 21b via F7 so as to contract ring seal 21b and urge it slightly out of its respective recess 23b into seating and locking engagement on complemental detent 19b. Thus, although high pressure fluid P surrounds slide positioner 13, positioning device 1 is locked in an operative position by virtue of ring seal 21b.

Upon the per chance inactivation of electrical power to pilot valves 29 and 31 or loss of fluid pressure P, such as by a power failure (to the fluid compressor) or by a maintenance shutdown, the pressure of fluid P will drop to atmospheric pressure. This permits the pressure in slide position device 1, including conduit means F1 and F8, to drop to atmospheric. Slide positioner 13 will continue to maintain its position because of the locking power of ring seal 21b. Since the segment diameter of ring seal 21b is greater than the width of the annular space defined by the surface of slide positioner 13 and the surface of bore 5, ring seal 21b spans or extends into both recess 23b and detent 19b thus providing a mechanical lock on positioner 13. The unexpanded ring diameter of the seal, as aforedescribed, being substantially equal to or slightly less than the ring diameter of the detents, permits the ring seal to seat in the detent and to hold in the detent under conditions of little or no pressure. Thus, a unique feature of this invention is the ability of the slide positioner 13 to maintain its selected position under conditions of both high pressure operation and of little or no pressure.

To move slide positioner 13 to the other operating position, i.e., at the other end of bore 5, pilot valve 29 is momentarily energized to shift to a position wherein the fluid pressure in conduits F1, F2, F5 and F7 is exhausted to the atmosphere. The pressurized fluid P in fluid conduits F3, F4, F6, and F8 urges slide positioner 13 toward the new operating position. High pressure fluid P not only pushes against the right end of slide positioner 13 but it also travels down the annular area defined by the outside of slide positioner 13 and the periphery of bore 5 until it meets ring seal 21b. Here, pressurized fluid P will force ring seal 21b to expand out of mating engagement with detent 19b and into its respective recess 23b thereby freeing slide positioner 13. Upon return of valve 29 to its normally open position, slide positioner 13 is once again surrounded by high pressure fluid P, but is locked in position by ring seal 21a in seating and locking position on complemental detent 19a.

Figure 2:
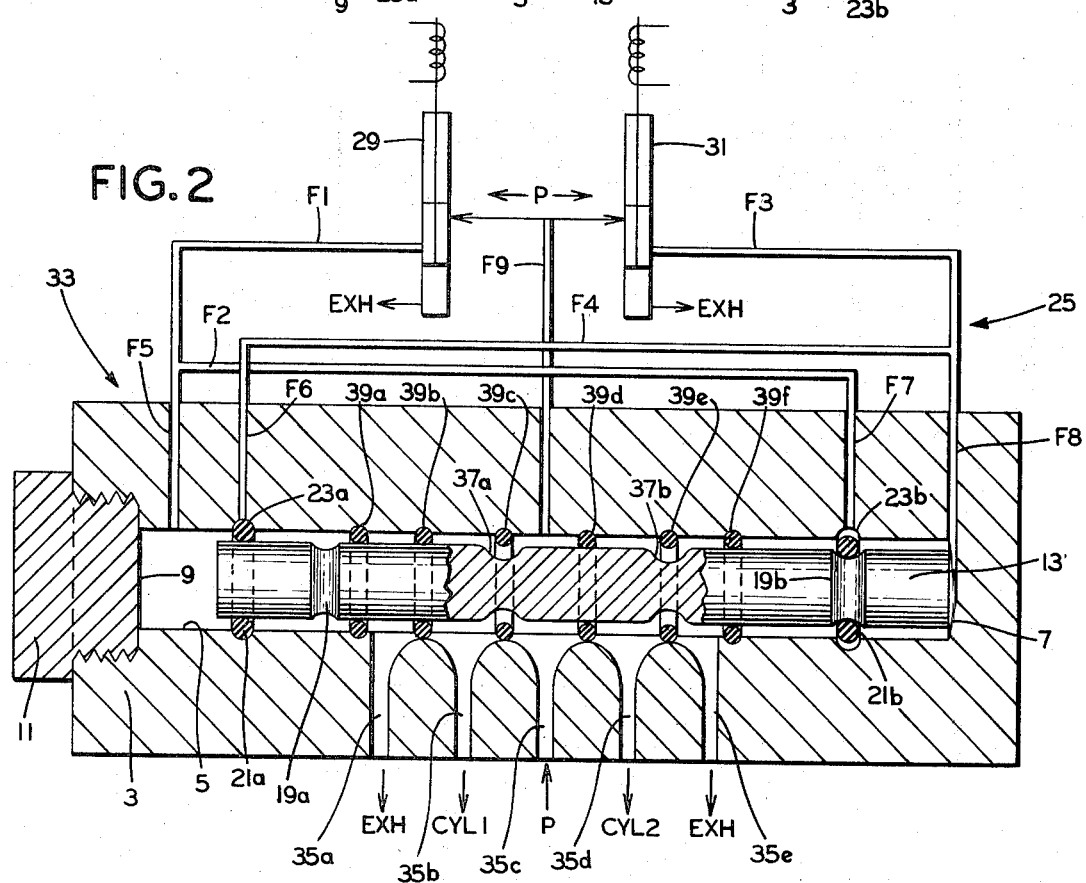
FIG. 2 is a partly diagrammatic view, in longitudinal section, of a valve unit in accordance with another embodiment of this invention, showing the slide valve in one operating position.

FIG. 2 shows one embodiment of a fluid valve unit 33 of this invention; it is constructed similar to the positioning device of FIG. 1 and contains many of the same or similar elements including a body 3 that includes a bore 5 that has a plurality of pressure fluid flowing ports 35a to 35e for conducting fluid under pressure P to cylinders 1 and 2 (CYL1 and CYL2) and to twin exhaust ports (EXH). Fluid valve unit 33 also includes a slide valve 13 similar to slide positioner 13 in FIG. 1 that is reciprocable in bore 5, however, instead of a slide positioning arm 15, slide valve 13 has fluid grooves 37a and 37b that permit passage of fluid P from port 35c to the other ports when slide valve 13 is in the desired position. Valve unit 33 also contains bore ends 7 and 9 wherein bore end 9 is formed by bushing 11 and further contains ring seals 21a and 21b in combination with their respective recesses 23a and 23b and their complemental detents 19a and 19b that are spaced along slide valve 13. First means 25 is shown in a position identical to that as in FIG. 1 and includes fluid conduit means F1 to F8 inclusive with the exception that high pressure P is optionally brought from port 35c through the annular space between the periphery of bore 5 and the outer surface of slide valve 13 up through a fluid conduit means F9 and into pilot valves 29 and 31. Also included in bore 5 are a plurality of slide valve seals 39a through 39f that prevent fluid from flowing between ports 35a - 35e at certain positions of slide valve 13.

As shown in FIG. 2, slide valve 13 is in one operating position wherein high pressure fluid P enters body 3 through port 35c and passes around and through the annular opening between fluid groove 37a and slide valve seal 39c and passes out through port 35b to enter cylinder 1 or whatever device is desired. Fluid is prevented from traveling further than port 35b by virtue of the sealing effect of slide valve seals 39b and 39d which bracket in the annular space between the periphery of slide valve 13 and the surface of bore 5.

Figure 3:
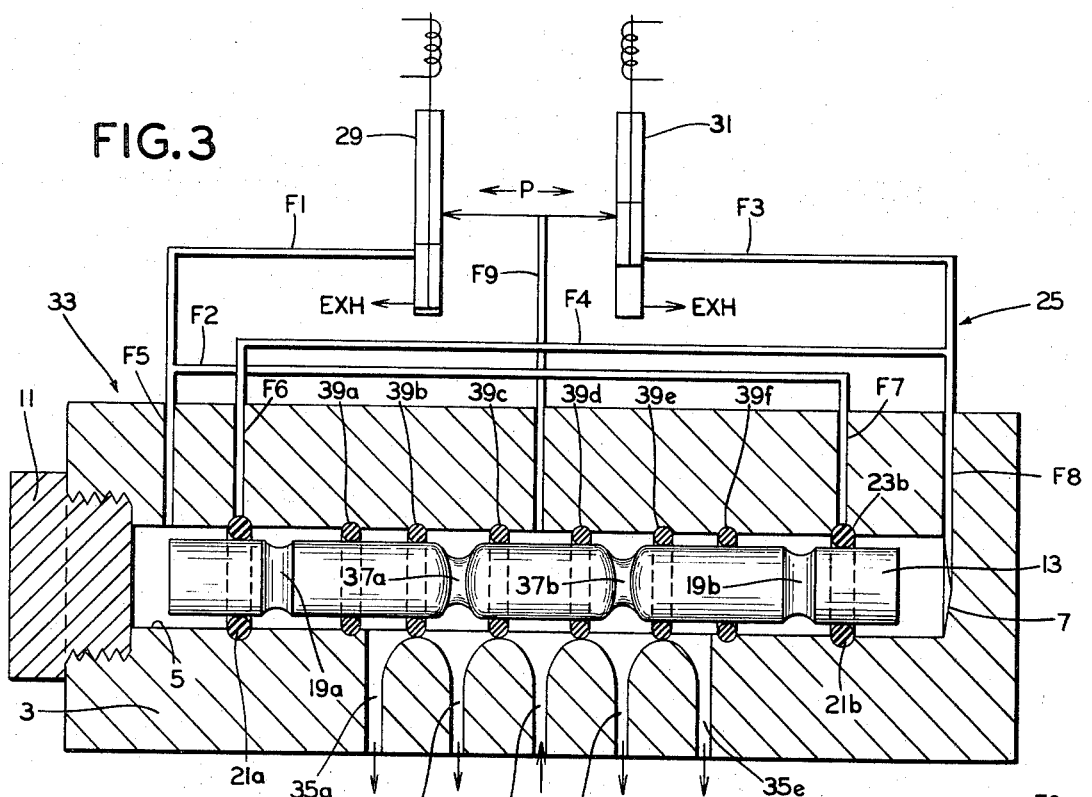
FIG. 3 is a view similar to FIG. 2 showing the slide valve being moved from the position of FIG. 2 to another operable position.

FIG. 3 shows a view similar to FIG. 2 except that slide valve 13 is being urged into another operating position by momentarily exhausting high pressure P through pilot valve 29 and thereby reducing the pressure in fluid conduit means F1, F2, F5, and F7 so as to release pressure on the left end of slide valve 13 and the constraining pressure on ring seal 21b. High pressure fluid P in fluid conduit means F3, F4, F6 and F8 expands ring seal 21b out of seating engagement with detent 19b to free slide valve 13 for reciprocal movement in bore 5 and to urge slide valve 13 toward the left in bore 5, i.e., to the next operating position.

Figure 4:
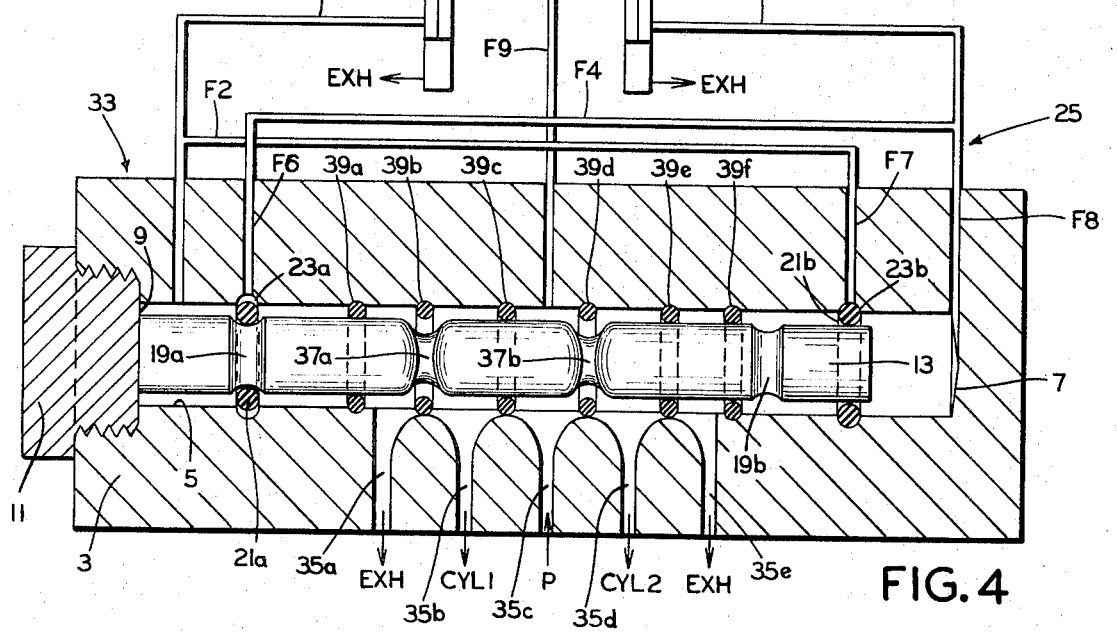
FIG. 4 is a view similar to FIGS. 2 and 3 showing the slide valve in a second operating position.

In FIG. 4, slide valve 13 is shown in a second operating position, having been moved from the first operating position shown in FIG. 3. Upon arriving at the second operating position, ring seal 21a, under pressure of fluid P via pilot valve 31 and fluid conduits F3, F3 and F6, compresses and seats in detent 19a to lock or restrain slide valve 13 from further movement. Ring seal 21b that was expanded out of detent 19b into its respective recess 23b by action of high pressure fluid P via fluid in conduit F8 and the annular space between the outside of slide valve 13 and the periphery of bore 5 rests in sliding engagement on the surface of bore 5 and does not thereafter mate with its respective complemental detent 19b until slide valve 13 has been moved back to the original operating position.

In this new operating position pilot valves 29 and 31 return to their normally open position and slide valve 13 is restrained from further movement by the locking action of ring seal 21a. Even if the pressure of fluid P were to decrease to zero or atmospheric or if the electrical power to valves 29 and 31 were to fail, slide valve 13 is restrained from unwanted motion by action of the snug fit of ring seal 21a in detent 19a spanning into recess 23a. Slide valve 13 now diverts high pressure fluid P from port 35c to port 35d of cylinder 2 while diverting fluid pressure from port 35b to the adjacent exhaust port 35a.

Pilot valves 29 and 31 may be of the type that are normally open (during inactivation) and closed upon activation or may be of the normally closed type. As shown in the figures, they are of the normally open type. It is within the ambit of one skilled in the art to connect pilot valves 29 and 31 to the proper fluid conduits, F1 and F3 respectively, regardless of the normal position of the valve. Further, pilot valves 29 and 31 may be housed in a single pilot valve device wherein the various connections are made in one valve housing so that operation of one valve stem will provide all of the functions that are shown to be accomplished by pilot valves 29 and 31. Still further, pilot valves 29 and 31 may be operated by electric coils (solenoids) or other means such as fluidic or mechanical drives.

Figure 5:
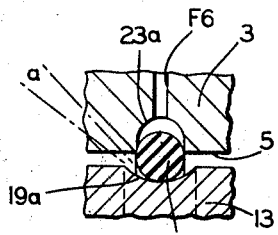
FIG. 5 is an enlarged detailed view of one embodiment of the ring seal and its mounting taken from any of the foregoing figures.

FIG. 5 shows one embodiment of the ring seal and associated recess and detent configuration of this invention and shows recess 23a to comprise a round bottom groove in the periphery of bore 5 and shows detent 19a to comprise a round bottom groove in the periphery of slide valve 13 wherein the radius of curvature of detent 19a is greater than the radius of curvature of ring seal 21a in its normal, i.e., non-deformed and non-expanded, configuration and wherein the radius of curvature of recess 23a is substantially equal to the radius of curvature of ring seal 21a. The greater radius of curvature of detent 19a permits the mating surfaces of ring seal 21a and detent 19a to meet at an acute angle "a". Angle "a" permits high pressure fluid P to enter substantially under ring seal 21a and urge it outward and deeper into recess 23a so as to disengage ring seal 21a from detent 19a prior to or during the first part of movement of slide valve 13 from its second operating position (as shown in FIG. 4) back to its first operating position (as shown in FIG. 2). The radius of curvature of recess 23a is maintained substantially equal to the radius of curvature of ring seal 21a, in this particular embodiment, to provide adequate seating for ring seal 21a as high pressure fluid P forces it from detent 19a deeper into recess 23a by virtue of the pressure drop that is created between the annular space defined by the periphery of bore 5 and the outer surface of slide valve 13 across the contacting surface of ring seal 21a and recess 23a and into fluid conduit means F5. Quite obviously, full contact of the surface of ring seal 21a with recess 23a does not require a lead angle for introduction of fluid to unseat or contract ring seal 21a from recess 23a but merely requires high pressure fluid P to pass down through conduit means F6 and force ring seal 21a partially from recess 23a.

Figure 6:
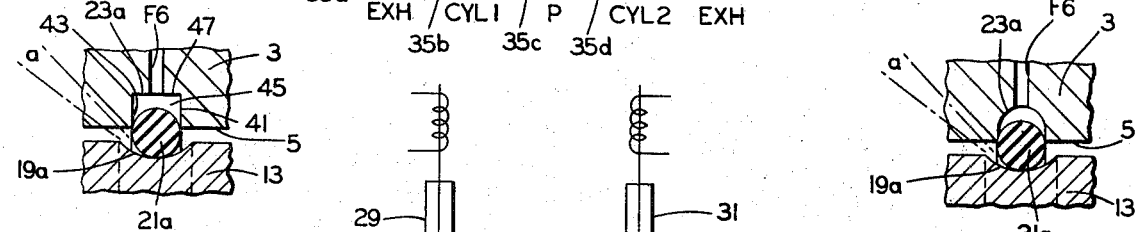
FIG. 6 is a view similar to FIG. 5 showing another embodiment of the ring seal and its mountings.

FIG. 6 shows a further embodiment wherein recess 23a comprises a stepped groove 41 whose maximum width is substantially equal to the outside segment diameter of ring seal 21a in its non-distorted configuration. As is widely known in fluidic circuitry, there is a continual flow of fluid, albeit quite minute in some cases, between most pressurized fluid connecting elements. In this particular embodiment, therefore, there may continue to be a trickle of flow of high pressure fluid P from the chamber 45 formed between the surface of ring seal 21a and the outer diametrial edge 47 of groove 41 down through the annular space defined by the periphery of bore 5 and the outer surface of slide valve 13 past the contact portions of ring seal 21a and the outside edge 43 of stepped groove 41 even when ring seal 21a is contracted into seating engagement with detent 19a. Upon reversal of the flow of high pressure fluid P in the afore-described spaces, high pressure fluid P will cause a reverse pressure drop across the contact area of outside groove edge 43 and ring seal 21a in the direction of fluid conduit F6 so as to aid the disengagement of ring seal 21a from detent 19a with fluid P entering contact angle "a". Upon expansion of ring seal 21a against outermost diametrial edge 47 (and out of mating engagement with complemental detent 19a) the mating section of the rounded outer surface of ring seal 21a with the flat surface of outer diametrial edge 47 will provide a better high pressure seal, i.e., less leakage than would normally be obtained with the rounded recess configuration shown in FIG. 5.

There may be more than two ring seals 21a and 21b used in this invention to obtain the advantage of greater locking force on slide valve 13 for special uses such as in high speed aircraft engines and control systems where high "g" loads are commonly encountered. Additional ring seals may be conveniently spaced along bore 5 with complemental recesses and detents; by connecting these additional seals in series with either fluid conduit means F6 or F7, the additional seals will be made to move simultaneously with the main respective ring seal 23a or 23b.

The embodiments shown in the figures have been built and tested to determine the initial pressure required to move slide valve 13 from one position to another as a function of time as well as to determine the amount of pressure required to operate the valve continuously and further to determine the amount of force necessary to disengage or move slide valve 13 from one of its operating positions during inactivation of second means 27. By "inactivation" is meant that either the power to operate second means 27 is terminated, thereby permitting full pressure P to be applied to all surfaces of slide valve 13 and to ring seals 21a and 21b in the direction of contracting them into mating engagement with slide valve 13, or that the pressure of fluid pressure P is decreased to zero or atmospheric thereby applying no pressure to the surfaces.

As a means of comparison, a valve similar to that shown in FIGS. 2, 3 and 4, but with ring seals 21a and 21b removed, was tested and found to require 12 pounds per square inch (psi) operating pressure at time "0" to 31 psi after approximately 16 hours of inactivity. With ring seals 21a and 21b installed in the same valve and with various detent configurations, the operating pressure was found to range from 14 psi continuous to 38 psi after approximately 16 hours of inactivity. By time "0" is meant that slide valve 13 was not allowed to remain in an operating position longer than a few seconds, i.e., almost continuous operation; by "16 hours" is meant that slide valve 13 was held in one operating position for 16 hours prior to movement to another operating position. Such a test is recognized in the industry and is important because, as time increases, the lubricating film of fluid between mating portions of the ring seals, the slide valve seals, and the contacting surfaces of slide valve 13 and bore 5 break down so that more pressure is required to overcome this increased frictional force. These tests indicate that addition of detent seals 21a and 21b can be made to have little effect on normal operation pressure of valve 33.

The effectiveness of ring seals 21a and 21b and their complemental detents 23a and 23b was then tested in a similar manner to determine the external force necessary to move the slide under 0 psi (gauge) pressure conditions after continuous valve operation or time "0" and after setting for approximately 16 hours. These tests were conducted on the same valve with ring seals 21a and 21b removed. After continuous operation or time "0", the force required to move slide valve 13 from its operating position was 7 pounds; after approximately 16 hours, the force required was found to be 18 pounds. With ring seals 21a and 21b installed, the external force required to move slide 13 out of its operating position after continuous operation or time "0", was found to be 21 pounds; and after approximately 16 hours of inactivity, the required force was found to be 45 pounds. These tests show that the ring seal-complemental detent described above has little effect on valve performance when operating normally, but greatly increase, by approximately 300 percent, the resistance to external, undesirable forces (i.e., jarring) acting on the unit to cause unwanted change in position of the slide.

Ring seals 21a and 21b are made of resilient elastomeric materials such as nitrile rubber, neoprene, etc. They may be of circular cross-section; however, other configurations are contemplated herein such as hexagonal, oblong, square, winged, slotted, etc. Generally speaking, these non-circular configurations find use in special circumstances and under special conditions such as low-pressure operation, special fluid environment, and the like.

What is claimed is:

1. A rectilinear positioning device comprising:
   a. a body including a bore;
   b. a slide positioner reciprocable in said bore between two operating positions;
   c. at least two elastic ring seals spaced along said bore and partially recessed into the periphery thereof, said seals having an unexpanded ring diameter substantially equal to or slightly less than the ring diameter of complemental detents or recesses on the slide positioner into which the seals are selectively seated;
   d. first means for applying fluid pressure to said ring seals to contract and expand them in their respective recesses, and for applying fluid pressure to the ends of said slide positioner; and,
   e. second means for causing said first means to selectively expand at least one of said seals into its recess and contract at least one of said ring seals into engagement with said slide positioner while simultaneously urging said positioner to the other operating position where said contracted ring seal will seat in a complemental detent on said positioner to immobilize said positioner such that, upon inactivation of said first or said second means, said slide positioner is restrained from movement.

2. The device of claim 1 wherein said ring seals are located near the ends of said slide positioner.

3. The device of claim 1 wherein said recesses and said detents comprise round-bottom grooves of slightly greater radius than the radius of said ring seals.

4. The device of claim 1 wherein said recesses comprise stepped grooves.

* * * * *